Patented July 31, 1945

2,380,775

UNITED STATES PATENT OFFICE 2,380,775

COMPOUND FABRICS AND PROCESS FOR PRODUCING THE SAME

Hans Meyer, Twickenham, England

No Drawing. Application May 7, 1943, Serial No. 486,105. In Great Britain April 9, 1942

16 Claims. (Cl. 154—2)

This invention relates to the manufacture of compound fabrics.

Numerous processes have been proposed for the manufacture of compound fabrics wherein an interlayer containing or consisting of a cellulose derivative or a synthetic resin composition is caused to adhere to two outer layers. Usually in such processes adhesion was brought about by soaking the assembly in a solvent or swelling agent for the cellulose derivative or synthetic resinous composition and then uniting the layers by heat and pressure.

The use of a solvent involves a number of serious disadvantages:

In the case of a lining treated or coated with a cellulose derivative the solvent or solvents used prohibit the use of cellulose derivative material for the outer layers, as this would wholly or partly be destroyed by the solvent. Thus, for example, cellulose acetate cannot be united with a lining treated with a cellulose derivative.

Most of the dyes employed for dyeing the outer fabrics tend to be affected by the solvent or solvents.

The cellulose derivative or resin composition is released and consequently absorbed by the outer fabrics. Thus these outer layers contain almost as much cellulose derivative or resin as the lining. On tearing the assembly apart it will be found that the outer layers have acquired nearly the same stiffening effect as the lining. Nowhere is there sufficient cellulose or resin present to cause adhesion again by heat and pressure only. This is of particular importance in view of the fact that even the best bond can be loosened by the mechanical strain of the washing process. If this happens there are no means of fully restoring the original bond unless a solvent is used again, since heat and pressure are not sufficient to effect adhesion. The solvent, however, could not be used conveniently in the household or laundry, particularly in view of the fact that only the formerly stiffened parts, such as collars and cuffs, have to be re-stiffened.

A further disadvantage of most processes for the manufacture of compound fabrics, originating from the fact that the cellulose derivative or resin composition is released and absorbed by the outer fabrics, is that they do not become limp on wetting with water but retain most of their adherent stiffness. Thus the outer layers of fabric are exposed to an additional strain in the washing process, particularly at any line of folding.

It is an object of the present invention to overcome these disadvantages and to provide an improved compound fabric having the various advantages described hereinafter.

With this object in view the present invention provides a process for the manufacture of a compound fabric wherein a fabric or paper is coated or impregnated with a water-insoluble but water-absorbent inorganic gel, preferably colloidal silicic acid, then treated with a solution or dispersion of a thermoplastic synthetic resin or a chlorinated natural or synthetic rubber and caused to adhere to one or two layers of fabric by the application of heat and pressure, the thermoplastic synthetic resin or chlorinated natural or synthetic rubber having a softening point above 100° C. but below the temperature at which any of the fabrics employed in the manufacture of the compound fabric is damaged by heat.

The expression "temperature at which any of the fabrics employed in the manufacture of the compound fabric is damaged by heat" as used herein means in respect of wool a temperature of 170° C., in respect of cotton a temperature of 210° C., in respect of linen a temperature of 220° C., in respect of acetate artificial silk a temperature of 160° C., in respect of viscose a temperature of 160° C., and in respect of silk a temperature of 190° C.

Other water-insoluble but water-absorbent inorganic gels which may be used are colloidal stannic acid, stannous acid, aluminum hydroxide and ferric hydroxide.

When colloidal silicic acid is used the fabric or paper is preferably coated or impregnated with the colloidal silicic acid by first treating the fabric or paper with an aqueous solution of a soluble silicate such as sodium silicate and thereafter treating the impregnated fabric or paper with a dilute solution of an acid such as hydrochloric acid, thereby precipitating colloidal silicic acid. The fabric or paper may, however, be coated or impregnated with the colloidal silicic acid in any other convenient manner, for example by coating or impregnating the fabric or paper with a silicic ester such as the tetraethyl or tetramethyl ester of silicic acid and then causing or allowing the ester to hydrolyse with the production of colloidal silicic acid.

Examples of suitable thermoplastic synthetic resins are polyvinyl resins, polymerised methyl methacrylate and polymers of other esters of methacrylic and acrylic acids.

The term "polyvinyl resin" as used herein refers to such compounds as the polymerised vinyl esters of the lower aliphatic acids, for example vinyl acetate, vinyl propionate, vinyl butyrate, the polymerisation product of a mixture of vinyl chloride and vinyl esters of the lower aliphatic acids, polyvinyl acetal and polystyrol.

If solutions of the synthetic resins or chlorinated rubber are employed, examples of suitable solvents are toluene, xylene, acetone, methyl ethyl ketone, methyl alcohol, carbon tetrachloride, dichlorethane, ethyl alcohol, butyl acetate and ethyl acetate.

If a dispersion of the synthetic resin or chlorinated rubber is employed the dispersion may be prepared with the aid of a suitable dispersing agent, for example triethanolamine, or the salts of sulphated higher alcohols such as, for example, the sodium salt of sulphated lauryl alcohol.

The layers which are caused to adhere to the coated or impregnated fabric or paper may be of any desired textile material, for example wool, cotton, linen, silk, celulose acetate artificial silk or viscose artificial silk.

The following examples illustrate how the process of the invention may be carried into effect:

1. Cotton fabric was immersed in a 7% aqueous solution of sodium silicate, treated with a 3% aqueous solution of hydrochloric acid and rinsed in water to remove any excess acid. After drying, the fabric was impregnated with a solution consisting of 50 gms. of polyvinyl acetate in 160 gms. of methylated spirit and 8 gms. of triacetin. The material was then dried and sewn to two layers of cellulose acetate artificial silk fabric, one on each side of the impregnated fabric, and subjected to pressure at a temperature of 150° C. to produce a compound fabric.

2. Paper was coated with a 7% aqueous solution of sodium silicate and neutralised with dilute acetic acid. After drying, it was impregnated with a dispersion containing 50 gms. of polyvinyl acetal, 50 gms. of toluene, 12 gms. of methyl phthalate, 100 gms. of water, 12 gms. of oleic acid and 4 gms. of triethanolamine. The material was then dried and sewn to two layers of woollen fabric, one on each side of the impregnated fabric, and subjected to pressure at a temperature of 150° C., to produce a compound fabric.

3. Cotton fabric was coated with a 6% aqueous solution of sodium silicate and neutralised with dilute hydrochloric acid. After drying it was impregnated with a solution consisting of 50 gms. of chlorinated rubber, 150 gms. of butyl acetate, 50 gms. of xylene and 25 gms. of dibutyl phthalate. The material was then dried and sewn to two layers of cotton fabric, one on each side of the impregnated fabric, and subjected to pressure at a temperature of 180° C.

The process of the present invention overcomes the disadvantages mentioned above. The impregnation or coating with colloidal silicic acid or other water-insoluble but water-absorbent inorganic gel has the effect of allowing the fabric or paper treated therewith to absorb larger quantities of synthetic resin or chlorinated rubber solution or dispersion than a fabric or paper not so treated. Thus, a compound fabric is produced with an extremely strong bond between the inner lining and the outer layers of fabric. When the layers are torn apart it will be found that the outer layers have retained most of their characteristic properties including their original softness. Consequently they tend to absorb water more readily, and so become limp and more easily washable than fabrics which have previously absorbed a large amount of water-repellent cellulose derivative or resin composition. But their original stiffness is regained on subjection of the fabrics to heat and pressure.

It is believed that the loss of stiffness and ease with which the fabrics may be washed is due to the fact that the interlining treated with the gel not only absorbs exceedingly large quantities of resin or chlorinated rubber but is equally absorbent towards water after the evaporation of solvent or water. It is also believed that the use of colloidal silicic acid or other water-insoluble but water-absorbent inorganic gel is a very important factor in producing the necessary stiffening.

The expression "solution" as used in the appended claims includes "dispersion" and the expressions "coating" and "coated" in the appended claims include "impregnating" and "impregnated" respectively.

I claim:

1. A process for the manufacture of a compound fabric which comprises forming a coating of a water-insoluble but water-absorbent inorganic gel substantially free from water-soluble salts upon the fibres of a fibrous sheet material by first treating the fibrous sheet material with a water-soluble inorganic salt and then converting the salt into a water-insoluble but water-absorbent inorganic gel, then treating the fibrous sheet material with a solution of a resinous material selected from the group consisting of thermoplastic synthetic resins, chlorinated natural rubber and chlorinated synthetic rubber, and causing the thus treated material to adhere to at least one layer of fabric by the application of heat and pressure, the said resinous material having a softening point above 100° C. but below the temperature at which any of the fabrics employed in the manufacture of the compound fabric is damaged.

2. A process for the manufacture of a compound fabric which comprises forming a coating of coloidal silicic acid upon the fibres of a fibrous sheet material by first treating the fibrous sheet material with a solution of a soluble silicate and then converting the silicate into colloidal silicic acid, then treating the fibrous sheet material with a solution of resinous material selected from the group consisting of thermoplastic synthetic resins, chlorinated natural rubber and chlorinated synthetic rubber and causing the thus treated material to adhere to at least one layer of fabric by the application of heat and pressure, the said resinous material having a softening point above 100° C. but below the temperature at which any of the fabrics employed in the manufacture of the compound fabric is damaged.

3. A process for the manufacture of a compound fabric which comprises forming a coating of colloidal aluminum hydroxide upon the fibres of a fibrous sheet material by first treating the fibrous sheet material with a solution of an aluminum salt and then converting said salt into collodial aluminum hydroxide, then treating the fibrous sheet material with a solution of resinous material selected from the group consisting of thermoplastic synthetic resins, chlorinated natural rubber and chlorinated synthetic rubber and causing the thus treated material to adhere to at least one layer of fabric by the application of heat and pressure, the said resinous material having a softening point above 100° C. but below the temperature at which any of the fabrics employed in the manufacture of the compound fabric is damaged.

4. A process for the manufacture of a compound fabric which comprises forming a coating of a water-insoluble but water absorbent inorganic gel substantially free from water-soluble salts upon the fibres of a fibrous sheet material by first treating the fibrous sheet material with a water-soluble inorganic salt and then converting the salt into a water-insoluble but water-absorbent inorganic gel, then treating the fibrous sheet material with a solution of a polyvinyl resin and causing the thus treated material to adhere to at least one layer of fabric by the application of heat and pressure, the said polyvinyl resin having a softening point above 100° C. but below the temperature at which any of the fabrics employed in the manufacture of the compound fabric is damaged.

5. A process for the manufacture of a compound fabric which comprises treating a fabric with an aqueous solution of a soluble silicate, then treating the fabric containing the soluble silicate with a dilute aqueous solution of an acid to precipitate coloidal silicic acid, washing the fabric to remove excess acid, drying the washed fabric, impregnating the same with a solution of a polyvinyl resin in an organic solvent, drying the fabric, attaching to said fabric two layers of fabric one on each side thereof and subjecting the assembly thus formed to heat and pressure to produce a compound fabric, the said polyvinyl resin having a softening point above 100° C. but below the temperature at which any of the fabrics used in the manufacture of the compound fabric is damaged.

6. A process for the manufacture of a compound fabric which comprises treating a fabric with an aqueous solution of a soluble silicate, then treating the fabric containing the soluble silicate with a dilute aqueous solution of an acid to precipitate colloidal silicic acid, washing the fabric to remove excess acid, drying the washed fabric, impregnating the same with a solution of a polyvinyl resin and a plasticiser in an organic solvent, drying the fabric, attaching to said fabric two layers of fabric one on each side thereof and subjecting the assembly thus formed to heat and pressure to produce a compound fabric, the said polyvinyl resin having a softening point above 100° C. but below the temperature at which any of the fabrics used in the manufacture of the compound fabric is damaged.

7. A process for the manufacture of a compound fabric which comprises treating a fabric with an aqueous solution of a soluble silicate, then treating the fabric containing the soluble silicate with a dilute aqueous solution of an acid to precipitate colloidal silicic acid, washing the fabric to remove excess acid, drying the washed fabric, impregnating the same with a solution of chlorinated rubber in an organic solvent, drying the fabric, attaching to said fabric two layers of fabric one on each side thereof and subjecting the assembly thus formed to heat and pressure to produce a compound fabric, the said chlorinated rubber having a softening point above 100° C. but below the temperature at which any of the fabrics used in the manufacture of the compound fabric is damaged.

8. A process for the manufacture of a compound fabric which comprises treating a fabric with an aqueous solution of a soluble silicate, then treating the fabric containing the soluble silicate with a dilute aqueous solution of an acid to precipitate colloidal silicic acid, washing the fabric to remove excess acid, drying the washed fabric, impregnating the same with a solution of chlorinated rubber and a plasticiser in an organic solvent, drying the fabric, attaching to said fabric two layers of fabric one on each side thereof and subjecting the assembly thus formed to heat and pressure to produce a compound fabric, the said chlorinated rubber having a softening point above 100° C. but below the temperature at which any of the fabrics used in the manufacture of the compound fabric is damaged.

9. A compound fabric comprising a layer of fabric and a layer of a fibrous sheet material, said fibrous sheet material having fibres thereof coated with a water-insoluble but water-absorbent inorganic gel substantially free from water-soluble salts, and said layer of fabric and said layer of fabrous sheet material being bonded together by means of a resinous material having a softening point above 100° C. but below the temperature at which the fibrous sheet material or the fabric would be damaged, said resinous material being selected from the group consisting of thermoplastic synthetic resins, chlorinated natural rubber, and chlorinated synthetic rubber.

10. A compound fabric comprising a layer of fabric and a layer of a fibrous sheet material, said fibrous sheet material having fibres thereof coated with a water-insoluble but water-absorbent silicic acid gel substantially free from water-soluble salts, and said layer of fabric and said layer of fibrous sheet material being bonded together by means of a resinous material having a softening point above 100° C. but below the temperature at which the fibrous sheet material or the fabric would be damaged, said resinous material being selected from the group consisting of thermoplastic synthetic resins, chlorinated natural rubber, and chlorinated synthetic rubber.

11. A compound fabric comprising a layer of fabric and a layer of a fibrous sheet material, said fibrous sheet material having fibres thereof coated with a water-insoluble but water-absorbent aluminum hydroxide gel substantially free from water-soluble salts, and said layer of fabric and said layer of fibrous sheet material being bonded together by means of a resinous material having a softening point above 100° C. but below the temperature at which the fibrous sheet material or the fabric would be damaged, said resinous material being selected from the group consisting of thermoplastic synthetic resins, chlorinated natural rubber, and chlorinated synthetic rubber.

12. A compound fabric comprising a layer of fabric and a layer of a fibrous sheet material, said fibrous sheet material having fibres thereof coated with a water-insoluble but water-absorbent inorganic gel substantially free from water-soluble salts, and said layer of fabric and said layer of fibrous sheet material being bonded together by means of a polyvinyl resin having a softening point above 100° C. but below the temperature at which the fibrous sheet material or the fabric would be damaged.

13. A compound fabric comprising a layer of fabric and a layer of a fibrous sheet material, said fibrous sheet material having fibres thereof coated with a water-insoluble but water-absorbent silicic acid gel substantially free from water-soluble salts, and said layer of fabric and said layer of fibrous sheet material being bonded together by means of a polyvinyl resin having a softening point above 100° C. but below the temperature at which the fibrous sheet material or the fabric would be damaged.

14. A compound fabric comprising a layer of fabric and a layer of a fibrous sheet material, said fibrous sheet material having fibres thereof coated with a water-insoluble but water-absorbent silicic acid gel substantially free from water-soluble salts, and said layer of fabric and said layer of fibrous sheet material being bonded together by means of a polyvinyl resin and a plasticizer having a softening point above 100° C. but below the temperature at which the fibrous sheet material or the fabric would be damaged.

15. A compound fabric comprising a layer of fabric and a layer of a fibrous sheet material, said fibrous sheet material having fibres thereof coated with a water-insoluble but water-absorbent silicic acid gel substantially free from water-soluble salts, and said layer of fabric and said layer of fibrous sheet material being bonded together by means of chlorinated rubber having a softening point above 100° C. but below the temperature at which the fibrous sheet material or the fabric would be damaged.

16. A compound fabric comprising a layer of fabric and a layer of a fibrous sheet material, said fibrous sheet material having fibres thereof coated with a water-insoluble but water-absorbent silicic acid gel substantially free from water-soluble salts, and said layer of fabric and said layer of fibrous sheet material being bonded together by means of chlorinated rubber and a plasticizer having a softening point above 100° C but below the temperature at which the fibrous sheet material or the fabric would be damaged.

HANS MEYER.